(12) United States Patent
Carroll

(10) Patent No.: US 6,249,427 B1
(45) Date of Patent: Jun. 19, 2001

(54) WEARABLE COMPUTER PACKAGING CONFIGURATIONS

(75) Inventor: David W. Carroll, Northfield, MN (US)

(73) Assignee: ViA, Inc., Burnsville, MN (US)

( * ) Notice: Subject to any disclaimer, the term of this patent is extended or adjusted under 35 U.S.C. 154(b) by 0 days.

(21) Appl. No.: 09/048,725

(22) Filed: Mar. 26, 1998

Related U.S. Application Data (60) Provisional application No. 60/041,384, filed on Mar. 26, 1997.

(51) Int. Cl.[7] .............................. G06F 1/16; G06F 3/00; G09G 5/00
(52) U.S. Cl. ..................... 361/683; 361/686; D14/107; D14/100; 708/139
(58) Field of Search ........................... 361/683, 681, 361/686, 730; 235/462, 472; 708/139, 140, 141, 142; D14/107, 100, 102, 105

(56) References Cited

U.S. PATENT DOCUMENTS

| | | |
|---|---|---|
| 4,555,812 * | 12/1985 | Akers . |
| 4,839,837 * | 6/1989 | Chang ................................ D14/100 |
| 5,263,118 | 11/1993 | Cornelison . |
| 5,264,992 | 11/1993 | Hogdahl et al. . |
| 5,265,238 | 11/1993 | Canova, Jr. et al. . |
| 5,285,398 | 2/1994 | Janik . |
| 5,305,181 * | 4/1994 | Schultz ................................ 361/680 |
| 5,305,244 | 4/1994 | Newman et al. . |
| 5,319,526 | 6/1994 | Takashima . |
| 5,379,057 * | 1/1995 | Clough et al. . |
| 5,384,686 | 1/1995 | Mesfin et al. . |
| 5,396,400 | 3/1995 | Register et al. . |
| 5,416,310 * | 5/1995 | Little . |
| 5,416,730 * | 5/1995 | Lookofsky . |
| 5,430,607 * | 7/1995 | Smith ................................ 361/683 |
| 5,455,746 | 10/1995 | Sato et al. . |
| 5,491,651 | 2/1996 | Janik . |
| 5,555,490 | 9/1996 | Carroll . |
| 5,572,401 | 11/1996 | Carroll . |
| 5,579,528 | 11/1996 | Register . |
| 5,581,492 | 12/1996 | Janik . |
| 5,583,744 | 12/1996 | Oguchi et al. . |
| 5,620,782 | 4/1997 | Davis et al. . |
| 5,625,829 | 4/1997 | Gephardt et al. . |
| 5,632,020 | 5/1997 | Gephardt et al. . |
| 5,644,472 | 7/1997 | Klein . |
| 5,646,820 | 7/1997 | Honda et al. . |
| 5,708,840 | 1/1998 | Kikinis et al. . |
| 5,719,743 | 2/1998 | Jenkins et al. . |
| 5,719,744 | 2/1998 | Jenkins et al. . |
| 5,724,224 | 3/1998 | Howell et al. . |
| 5,745,340 | 4/1998 | Landau . |
| 5,905,248 * | 5/1999 | Russell et al. ................. 235/462 |
| 5,948,047 | 9/1999 | Jenkins et al. . |
| 6,047,301 * | 4/2000 | Bjorklund et al. .............. 361/681 |

FOREIGN PATENT DOCUMENTS

| | | | |
|---|---|---|---|
| 0555106A1 * | 8/1993 | (EP) ................. | 361/680 |
| 0703522 A3 | 5/1996 | (EP) . | |
| 0898218 A2 | 2/1999 | (EP) . | |
| 06274456A * | 9/1994 | (JP) ................. | 361/680 |

* cited by examiner

*Primary Examiner*—Leo P. Picard
*Assistant Examiner*—Lisa Lea-Edmonds
(74) *Attorney, Agent, or Firm*—Dicke, Billig & Czaja, P.A.

(57) ABSTRACT

A flexible, wearable computer is convertible between a laptop configuration and a wearable configuration. The various computing elements and battery of the wearable computer are arranged by connector(s), fastener(s), and/or on a support and/or within a housing for operative communication with a display of the laptop computer or of a personal hand-held device, whether pocketable or non-pocketable. Of course, prior to deployment in a laptop configuration, the computing elements and battery of the wearable computer are capable of deployment in many configurations on the body to facilitate comfort and utility.

44 Claims, 5 Drawing Sheets

WEARABLE COMPUTER PACKAGING CONFIGURATIONS

CROSS-REFERENCE TO RELATED APPLICATION

The subject matter of this application is related to the subject matter of commonly assigned U.S. Provisional Patent Application No. 60/041,384 filed Mar. 26, 1997, priority to which is claimed under 35 U.S.C. § 119(e) and which is incorporated herein by reference in its entirety.

BACKGROUND OF THE INVENTION

1. Field of the Invention

The invention relates to personal computer systems, for example those designed to be worn by a human user, and more particularly, to features of such systems that optimize comfort, miniaturization, convertibility, durability, reliability and/or ease of manufacture.

2. Description of Related Art

Wearable computing devices of many different types are being used in a host of commercial, industrial and consumer environments. Many such computers are brick-like, however, concentrating a great deal of weight in a bulky, cumbersome box that must be strapped onto the body.

The best wearable computers are lightweight and flexible, demonstrating superior ergonomics and allowing use during all normal activities. According to one example, flexible circuitry or equivalent flexible transmission devices join physically independent computer modules, allowing comfortable distribution of the computer about the body to accommodate a wide variety of body morphologies. Standard-interconnect input/output devices allow easy user upgrades and modular replacements. Spread-spectrum wireless Local Area Networks allow interaction with other users and/or with a host computer system. Flexible wearable computing devices are comfortable, easy-to-use, convenient and powerful alternatives to the brick-like machines that until recently have been the only choice in the marketplace.

Commonly assigned U.S. Pat. Nos. 5,285,398, 5,491,651 and 5,581,492 to Janik, and commonly assigned U.S. Pat. Nos. 5,555,490 and 5,572,401 to Carroll, all of which are incorporated by reference herein, disclose a number of extremely advantageous designs that are expected to dominate over previous, box-like wearable computers.

Given the many opportunities that have arisen with the introduction of these technologies, it would be very advantageous to further develop, improve and specifically adapt these technologies in wearable-computing environment.

SUMMARY OF THE INVENTION

A flexible, wearable computer of the present invention is convertible into a laptop configuration, and from the laptop configuration to the wearable configuration. The various computing elements and battery of the wearable computer are arranged by connector(s), fastener(s), and/or on a support and/or within a housing for operative communication with a display of the laptop computer configuration. Of course, prior to deployment in a laptop configuration or personal hand held device, whether pocketable or not, the computing elements and battery of the wearable computer are capable of deployment in many configurations, together or separately, on, or near, the body to facilitate comfort and utility.

Connections between the computing elements, display, and/or battery are made by: (1) wire (e.g. Cable); (2) direct electrical and mechanical connection; or (3) wireless RF communication including combinations in which the computing elements, display, and/or battery can be snapped together and have wireless electronic communication. In other combinations, these devices can be snapped together and have electronic connection via cable or direct contact connection. Of course, the computing elements, display, and/or battery can also be unconnected and have either : (1) wireless communication; or (2) cable communication.

These type of connections between the computing elements, display and/or batteries can also be made to, and between, devices such as a microphone/speaker, keyboard, mouse, touchpad, each of which may be pocketable and/or wireless.

DETAILED DESCRIPTION OF THE PREFERRED EMBODIMENTS

A wearable personal computer (PC) or flexible, wearable PC is built in sections for comfort. Known flexible wearable computers are described in commonly assigned U.S. Pat. Nos. 5,285,398, 5,491,651 and 5,581,492 to Janik, and commonly assigned U.S. Pat. Nos. 5,555,490 and 5,572,401 to Carroll, all of which are incorporated by reference herein.

Figures 1, 2, 3, 4:
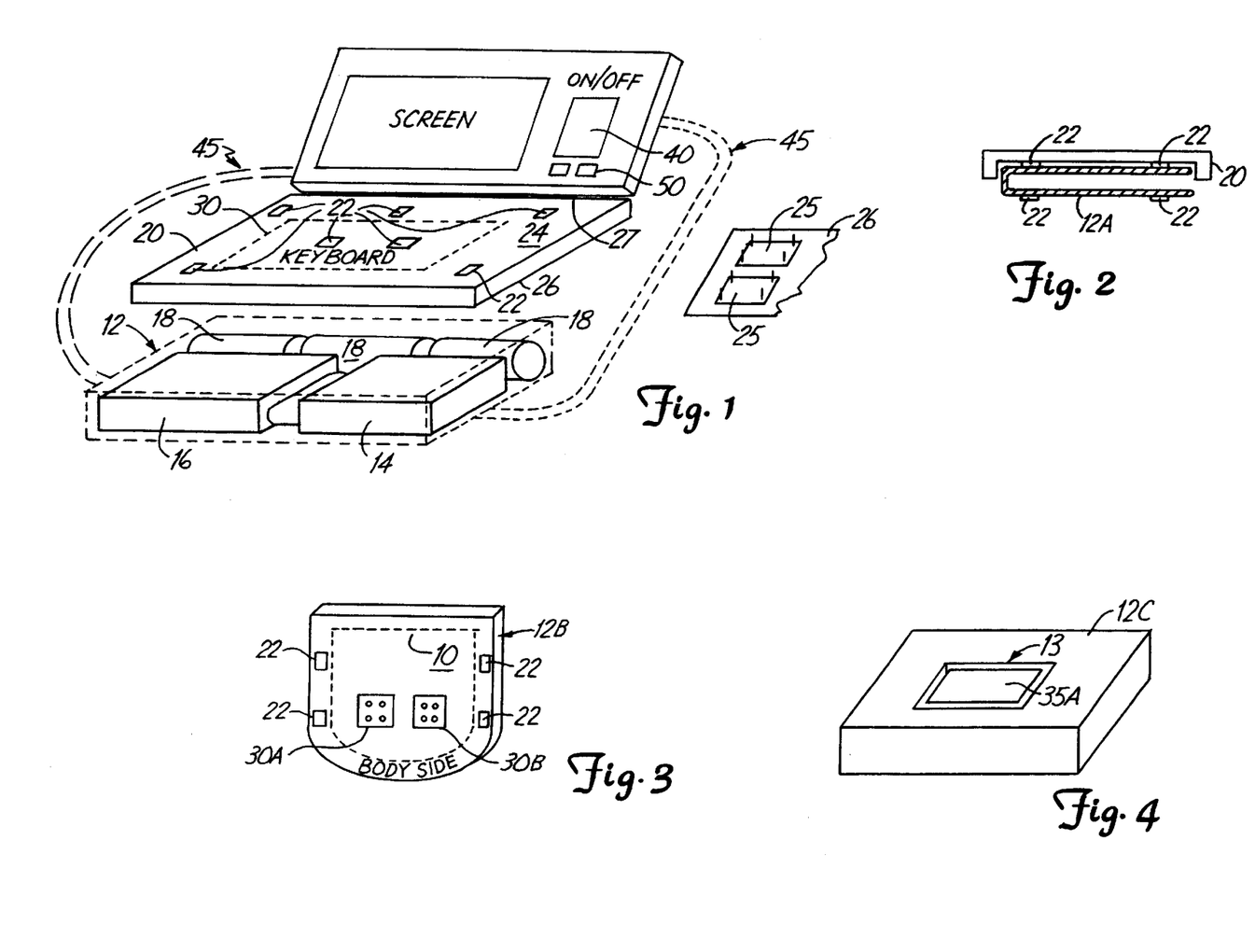
FIG. 1 is a perspective view of a convertible wearable and laptop computer of the present invention.
FIG. 2 is sectional view of an optional computing elements housing of the computer of FIG. 1.
FIG. 3 is an alternate embodiment of a wearable computing elements housing of the present invention.
FIG. 4 is a perspective view of an alternate embodiment of a wearable computing elements housing of the present invention with a display cavity.

In one embodiment of the present invention, as shown in FIG. 1, the components (e.g., battery, CPU, memory, etc.) of a wearable PC can be separated from their wearable configuration into separate, free standing components and can be optionally snapped or otherwise attached together by connector(s) and/or fastener(s), or arranged on a support into what would commonly be identified as, e.g., a laptop shape personal computer configuration (PC) 10. For example, laptop PC 10 in FIG. 1 includes a housing 12, PC components 14, 16, and 18, a support 20, optional keyboard (e.g., QWERTY) 30, and screen display 35 including an optional touch control pad 40 and optional mini keyboard 50. Support 20 is preferably attached to display screen 35 via a hinge 27. The components (14, 16, 18) of wearable PC 10 are arranged within housing 12, so that in combination with support 20 and display 35, the combination forms a laptop-type configuration. Moreover, the components (e.g., 14, 16, 18) of a wearable or flexible wearable PC can be mechanically rearranged from a wearable configuration to a notebook-type or even desktop configuration. Thus, when the wearer of a wearable computer boards an airplane, for example, the wearable can be reconfigured to better suit a confined environment.

The display screen 35 can also provided in a personal hand held device, whether pocketable or non-pocketable, instead of being part of a laptop computer.

Housing 12 (shown by dashed lines) of PC 10 is preferably removably attachable to support 20 to form the laptop configuration by using by fasteners 22 on top side 24 which can be snap-in fasteners, hook-and-loop fasteners, or other type fasteners 22, all of which are known in the art. Of course, a reciprocating set of fasteners 22 would be located on housing 12. As shown in FIG. 1, the housing 12 is separate from support 20 just prior to removable attachment thereon.

In the embodiment shown in FIG. 1, the keyboard 30 is removably secured to support 20 with housing 12 in a free standing relationship separate from support 20. However, optional keyboard 30 can be removably secured on top of the housing 12 (the housing 12 being secured on support 20) with fasteners 22 or can be free standing from support 20. Alternatively, or in combination, support 20 has section forms 25 on the bottom side 26 of support 20 allowing each of the components (e.g., 14, 16, 18) of the wearable computer to separately snap into bottom side 26 of support 20, thereby eliminating the need for housing 12.

The present invention also contemplates a direct supporting relationship for components (14, 16, and 18) by support 20 without direct connecting attachment and without a separate housing 10.

Connections between the computing elements 14,16, display 35, and/or batteries 18 are made by: (1) wire (e.g. Cable); (2) direct electrical and mechanical connection; and/or (3) wireless RF communication including combinations in which the computing elements 14,16, display 35, and/or batteries 18 can be snapped together and have wireless electronic communication, as well as can be snapped together and have electronic connection via cable or direct contact connection. Of course, the computing elements 14, 16, display 35, and/or batteries 18 can also spaced from each other (I.e. not be snapped together) and then have either: (1) wireless communication; (2) direct connection communication; or (3) cable communication.

These type of connections between the computing elements, display and/or batteries can also be made to, and between, devices such as a microphone/speaker, keyboard, mouse, touchpad, each of which may be pocketable and/or wireless. In one example, a limited range wireless local area network (LAN) is contemplated, eliminating wires extending from the convertible wearable/laptop computer 10 to other devices that the computer is operating or interfaced to. Such devices can be permanent or movable, and include docking stations, keyboards, mouse, mike/speaker, bar-code readers, screens, and other input/output devices, which are known in the art.

Housing 12 can comprise a box-like structure as shown in FIG. 1, and/or an elastic, e.g., U-shaped and/or sleeve-type enclosure 12A with fasteners 22 attached or attachable to the underside of support 20 as shown in FIG. 2. According to one embodiment as shown in FIG. 3, a pouch 12B holding a wearable computer has sides with hook-and-loop fasteners 22, the pouch forming a single shape of the wearable computer. The body-side of the single shape incorporates a membrane keypad 30A or keypad support/connection device 30B for use in the non-wearable configuration.

As illustrated in FIG. 1, an optional mini-touchpad and/or keypad/keyboard 40 with optional function keys 50 can be used instead of or even in addition to a full-size or reduced-size QWERTY or other keyboard 30, e.g., of the membrane or key cap type. This optional input device can include pen-based input, selectable relative/absolute positioning, zoom-in display and/or other features in accordance with commonly assigned U.S. Provisional Patent Applications Nos. 60/024,780, 60/028,028, and 60/036,195, which are incorporated herein by reference. If the QWERTY or other keyboard 30 is not used, the top side of support 20 can instead support or accommodate other input or output devices, for example.

Keyboard 30 and touchpad 40 and other elements (e.g., Function keys 50) of the upper portion of configuration 10 are operably connected to the computing elements (14, 16, 18) within housing 10 via a link 45 such as a wireless link, e.g., as part of a wireless body LAN system, i.e., a limited-range wireless LAN. Such LAN communication techniques are known to those skilled in the art. This arrangement allows easy switching between wearable and laptop configurations, without having to bother with connecting cables, etc. Other communication links are also contemplated, e.g., hardwired, fiber optic or other links. In the case where link 45 is a physical link, ready connectability and disconnectability is preferable as known in the art.

Computing module 18 can comprise batteries, which lie preferably in a row across the "top" of computing modules 14, 16, as viewed in FIG. 1. Batteries 18 can be inserted into housing 10 flexibly, e.g., they can be constructed of flexible material and/or have flexible wiring between them. To facilitate insertion of batteries 18 and components 14 and 16, housing 12 can be of a collapsible configuration, expanding out after removal from a stored configuration and allowing elements such as 14, 16, and 18 to be placed within.

As shown in FIG. 4, an alternative housing 12C, otherwise like housings 12, 12A, 12B, is provided with a cavity 13 for holding a miniature display screen 35A or screens that fit into the housing 2C. Use of this display screen 35A would eliminate the use and need for a separate screen display 35 as illustrated in FIG. 1. Alternatively, this cavity 13 may include known connectivity ports to also become a docking station to standard CRT's or flat panel displays that can be located separate from the housing 12C around an office environment or other activity centers in a work-station environment.

Figure 5:
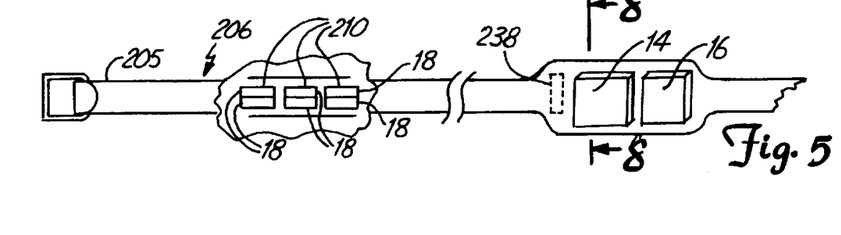
FIG. 5 is a plan view of a battery and computing element belt layout of the present invention.

FIG. 5 illustrates various wearable configurations 200, usable with or independently of configuration 10 (see FIGS. 1–4). Optional battery-mount locations are illustrated at 210 on belt 205, for example, with batteries 18 in three two-battery groupings. Computing modules 14, 16 (e.g., PCU, memory, etc.) are also shown. A pouch (similar to arrangement shown in FIG. 11) that houses modules 14,16 can include a mouth 238 located on user side of the belt 205 (mouth 238 can be extended for cable storage). Belt layouts can be chosen to suit particular circumstances and in various package sizes depending on, e.g., how the computer should best be wrapped about the body for a particular application.

Figure 6:
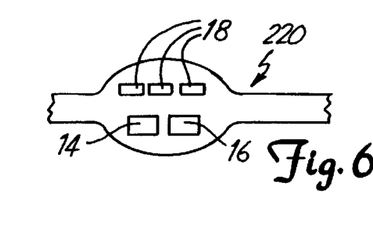
FIG. 6 is a plan view of an alternate battery and computing element belt layout of the present invention.
Figure 7:
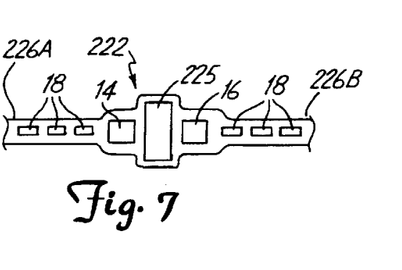
FIG. 7 is a plan view of an alternate battery and computing element belt layout of the present invention.

For example, FIG. 6 shows a belt layout 220 in which batteries 18 are disposed above computing pods 14, 16. Another belt layout 222 shown in FIG. 7 shows two battery sections, left 226A and right 226B, with three, e.g., double-cell batteries 18 each. In addition to pods 14, 16, a vertical central computing module 225 is included. Module 225 can be an additional dual PCMCIA card pod. Further details regarding FIGS. 1 and 2, and FIGS. 5–7, such as dual PCMCIA card pod 225 will be described with respect to FIGS. 13 and 14.

Figure 8:
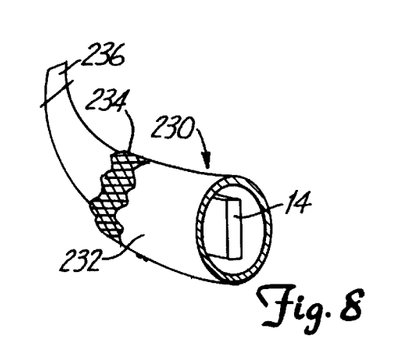
FIG. 8 is a plan view of a tube for a battery and computing element belt layout of the present invention.
Figure 9:
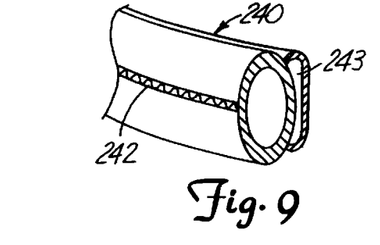
FIG. 9 is a plan view of an alternate tube for a battery and computing element belt layout of the present invention.

Various wearable belt-shaped, vest-shaped or other materials are contemplated to support and/or enclose elements 14, 16, 18, and 225. According to one embodiment, a belt 230 as shown in FIG. 8 is formed of a neoprene or neoprene-type material 232, for example in a seamless tubular shape, optionally covered with a canvas-type or nylon-tricot-type material 234 of one-quarter inch or other dimension and optionally having heat release characteristics. A neoprene-type material provides enhanced wearer comfort, because of its tendency to spread and "grip" the wearer more comfortably. A "skin-diving suit" type material is contemplated according to the invention. Adjustment mechanisms such as buckle and/or snap features 236 extend beyond ends of the, e.g., tube 230. In a seamed embodiment of a tube 240 as shown in FIG. 9, the single layer of neoprene or other material can be bound with, e.g., an elastic-stitch edge dressing 242 and/or zipper (e.g., zipper in the back to enhance cable-storage characteristics). A non-elastic stitch is also possible, but might tend to break when the belt is stretched. An additional pouch layer, as shown in FIG. 9, can be provided, allowing cable to lay within it, e.g., in a zig-zag fashion. A separable, interchangeable pouch layer 243 is contemplated, so that subsequent wearers are not exposed to the sweat/dirt associated with a previous wearer.

Figure 10:
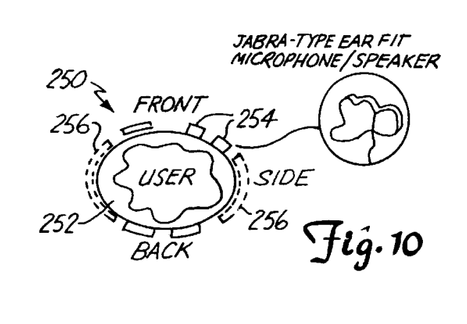
FIG. 10 is a top plan view of a battery and computing element belt layout of the present invention arranged about a user.

FIG. 10 shows a cross-sectional view of a portable computing system 250 with a belt 252 worn about a user showing a location for a hand-held-type interface 254 with including at least one of, or all of a display, touchpad, mike/speaker and/or other input/output devices. This view also shows potential battery locations 256 in dashed lines, e.g., on the sides of a wearer, using one of the earlier-described layouts (FIGS. 5, 6, 7). Microphone and speakers, such as in-the-ear mike/speakers available from Jabra Corporation, are contemplated for use in the hand-held type interface 254.

Figure 11:
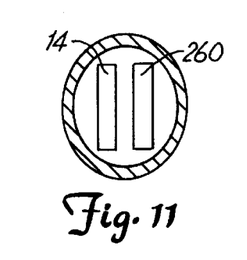
FIG. 11 is a sectional view of an alternate battery and computing element belt layout of the present invention.

Flexible enclosures for multiple battery cells present a number of advantages. A six-cell unit with a flexible overmold, for example, the six cells being connected by, e.g., stranded wire instead of being welded solid, provides enhanced wearability. The batteries can go into a second layer behind, as shown in FIG. 11) or above (similar to FIG. 6 except batteries 18 being in a single overmold) or elsewhere in relation to the computing elements.

Figure 12:
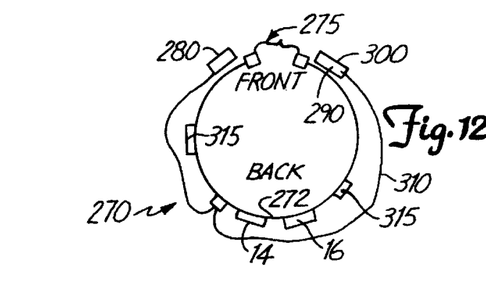
FIG. 12 is a top plan view of an alternate battery and computing element belt layout of the present invention arranged about a user with cabling and additional storage locations.

As shown in FIG. 12, belt 270 supports computing elements 14, 16, e.g., at the back 272. Buckle mechanism 275 secures belt 270 around the wearer. Two storage spots 280, 290 are also illustrated, with spot 280 being, e.g., for storing a display device 300 while the wearable computer is in use, and spot 290 being, e.g., for storing display device 300 while the wearable computer is hanging or in another non-use configuration. Cabling 310 connects display device 300 to computing elements 14,16 or other computing modules via, e.g., an associated interface, such as a PC card or other interface, such as those known in the art. Hook-and-loop fasteners 315, tabs, or other devices can be secured to belt 270 to guide and secure cabling 310, which according to one embodiment is about 30–36 inches long.

According to one embodiment, ribbon cable of the type known in the art, can be used instead of stranded wire for extending connections to docking, display or other devices as necessary in all the embodiments described herein, for example of the type that are permanently mounted at a location. Ribbon cable can also be used for hand-held, portable display devices, mike/speakers, etc. Because ribbon cable is not of a rounded shape, it can be stored better around a belt, or an arm, or a part of the body lying substantially flat, e.g., by hooks, flaps, hook-and-loop fasteners, automatic winding devices, by being tucked into a belt or other garment-type support structure, etc.

Embodiments of the invention also use heat-release mechanisms, e.g., a heat-release mesh, placed in a location such as 234 in FIG. 8. Heat preferably is conveyed across the unit to the front, away from the wearer's body. Particularly in wearable PC's, it is desirable to duct or otherwise route heat across the belt, especially to the front of the PC, e.g., in the case where the wearer sits down. Additionally, it is especially uncomfortable to place a processor against the back, given the heat generated. Therefore, embodiments of the invention place processor(s) off to the side, the back edge of the back, or the front, as shown in the above Figures. Moreover, a sweat band /back pad can be placed in the location of element 243 of FIG. 9.

Embodiments according to the invention described and shown herein also are configurable into a vest, helmet or other head covering, and other garment-type structures, such as those disclosed in U.S. Pat. 5,572,401, which are hereby incorporated by reference. For example, computing elements 14, 16 can be snapped in and out of a portion of a helmet. In addition, for example, computing elements 14, 16 can be located on an outside surface or inside surface of a helmet or cap, such as that shown in FIG. 17 of U.S. Pat. No. 5,572,401, which is hereby incorporated by reference. The computing elements 14, 16 in this arrangement can communicate together, via wires or wireless methods, as well as with a microphone/speaker system, and/or with a head-mounted optical display such as those known in the art, including reflective eyeglass display systems. In addition, computing elements 14, 16 and/or related devices (input/output, batteries, etc. as discussed above) can be disposed in pockets of pants and/or shirts, both well-known articles of clothing and can communicate together via wires or wireless methods. Finally, flexible computing elements 14, 16 can be removably incorporated into a shoe (for example, in the uppers and/or sole, etc.), a well-known article of clothing.

Figure 13:
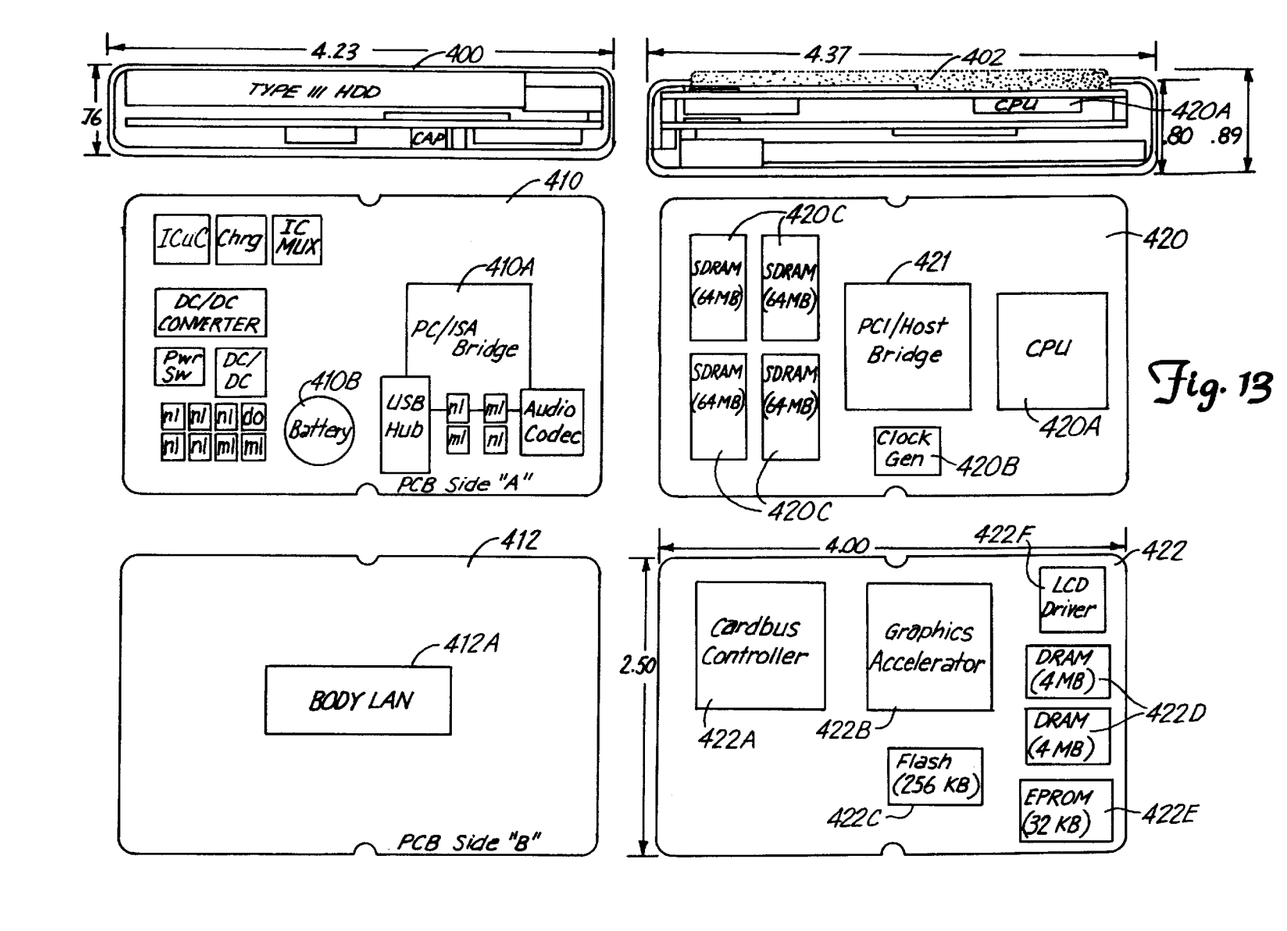
FIG. 13 is a schematic plan view of wearable computing components of an electronic computing module of the present invention.
Figure 14:
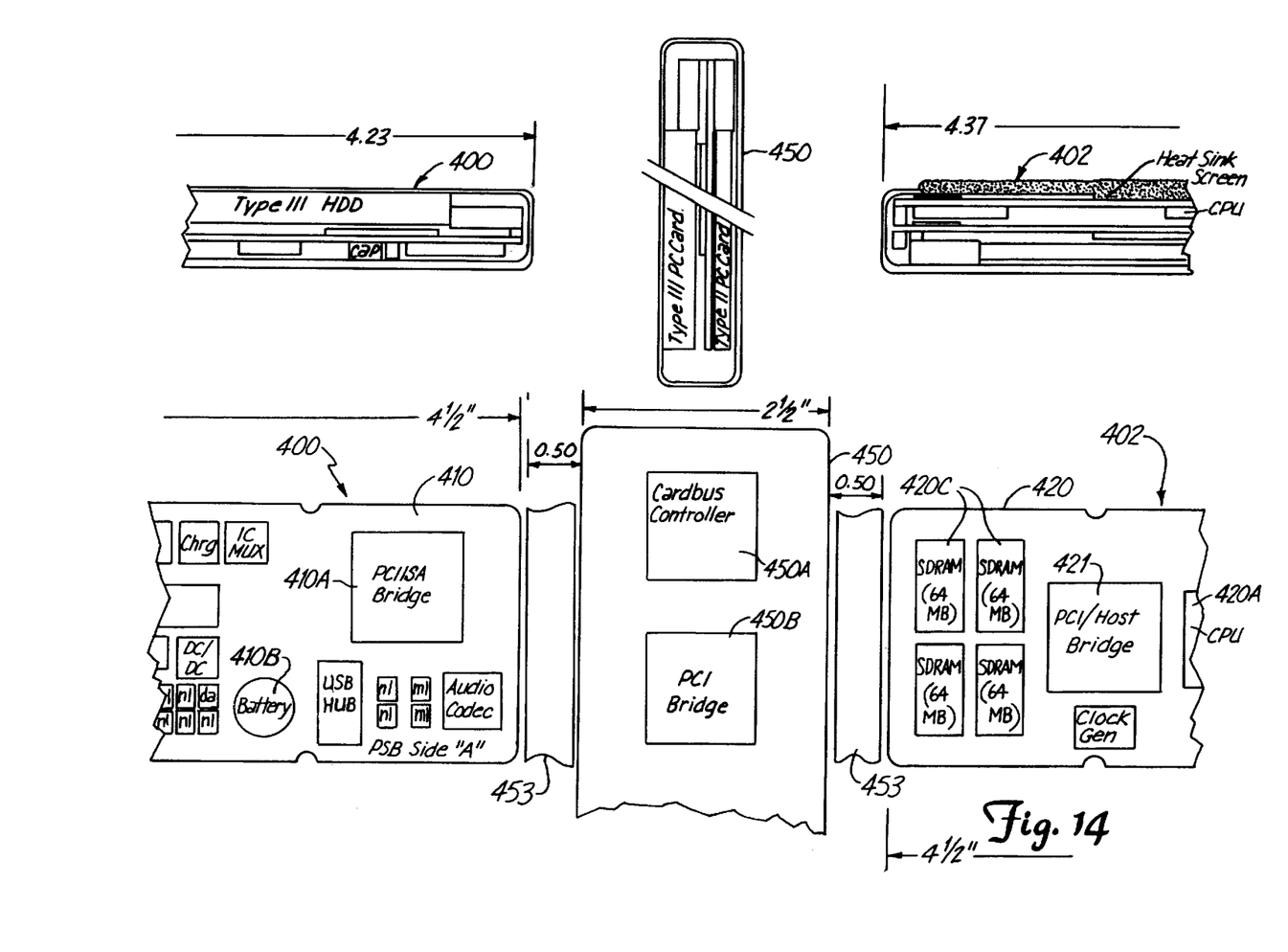
FIG. 14 is a schematic plan view of wearable computing components of an electronic computing module of the present invention arranged side by side in a three module configuration.

The illustrated design in FIGS. 13 and 14 is usable with the embodiments of FIGS. 1–2. A complete system is provided, capable of supporting, e.g., a single Type II PC card. As shown in FIG. 13, two computing modules 400 and 402 (which could function as computing modules 14,16 as presented in earlier embodiments) of preferably nearly equivalent proportion are created with computing elements 410 and 412, and 420 and 422, on opposite sides of a printed circuit board, respectively. Computing element 410 includes at least one of a PC/ISA bridge 410A, battery 410B, while computing element 412 includes bodyLAN element 412A. A PCI/Host bridge 421 and card controller is preferably located on a CPU computing element 420, to limit the amount of componentry running across the flex. Computing element 420 includes at least one of a CPU 420A, a clock 420B, and memory 420C. Computing element 422 includes at least one of a cardbus controller 422A, graphics accelerator 422B, flash memory 422C, memory one 422D, memory two 422E, and LCD driver 422F. Flexible circuitry between the modules carries PCMCIA and Zoom Video in addition to IDE and PCI buses. Minimal thickness is achieved, according to these embodiments, using standard packaged parts,.

FIG. 14 shows a vertical module 450 between the two side modules 400 and 402 of FIG. 13, which are moved apart an additional 3 inches, for example. With the vertical module 450 being about 2½ inches long and with about ½ inch of flexible circuitry 453 between the vertical module 450 and the respective modules 400 and 402. In summary, this results in a three module unit laid out side by side with module 450 arranged vertically between the modules 400 and 402, with flexible circuitry connecting the modules together. The overall length of the three module unit is then about 12 inches with modules 400 and 402 each having a length of about 4¼ inches and middle module 450 having a length of 2½ inches. Of course, alternative dimensions according to the invention are contemplated as well. For example, instead of using flexible circuitry between the modules 400, 402 and 450, connection and communication can occur through any of the methods described with respect to earlier embodiments of FIGS. 1–12. According to embodiments of the invention, each of the two illustrated computing modules 400 and 402 (with elements 410, 412, 420, 422, arranged therein) can include at least one of a PC card, one for hard drive and one for wireless LAN. A body LAN is also contemplated in which each of the components of the wearable configuration comprises a node of the LAN.

Figure 15:
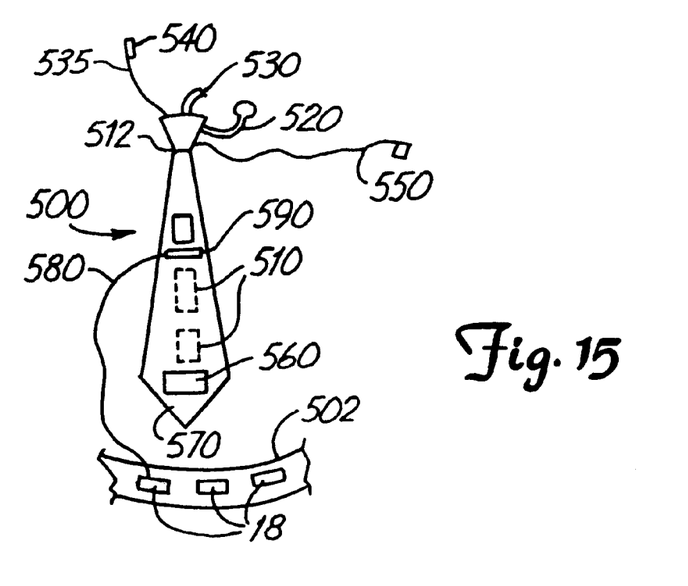
FIG. 15 is a perspective view of a wearable computer of the present invention embodied in a neck-tie.

According to other embodiments of the invention, batteries 18 in a flexibly configured belt 502, such as the examples shown above or batteries alone in a belt without computing elements, can be used to power a computer disposed in, e.g., a clip-on necktie 500 as shown in FIG. 15. Computing elements 510 are disposed along the body of the necktie, and attached in the region of the knot 512 is a pivot-up microphone 520 with noise-canceling and other features, for disposition near the wearer's mouth. Under the collar portion clasp 530, a pivot-up, preferably flexible wand 535 (shown extended) is provided with a speaker 540 presenting audible output to the wearer's ear. According to this embodiment, cabling 550 and/or other connecting devices is close to the mouth and close to the ear. A display screen 560 can be provided on a lower end 570 of the tie. A flexible cord 580 comes up to the tie 500 from the belt-mounted batteries 18, taking for example the form of a tie clasp 590 for connection to the computing elements 510 and other components. The layers of the tie optionally are of a transparent material, enabling viewing of chips, etc. within the tie.

Figure 16:
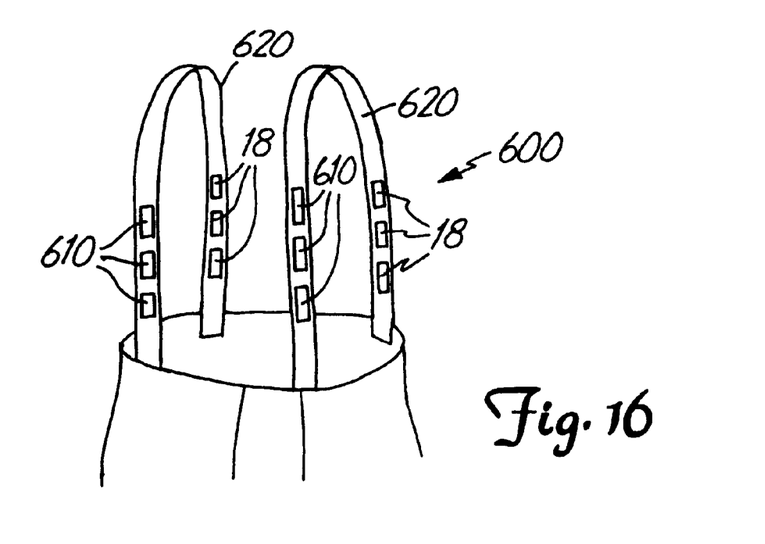
FIG. 16 is a perspective view of wearable computing elements of an electronic computing module of the present invention embodied in belt suspenders.

As shown in FIG. 16, a belt-and-suspenders embodiment 600 is also contemplated, with computing elements 610 (e.g., CPU, memory, etc.) and/or at least some batteries 18 disposed in a wearer's suspenders 620.

All of the wearable computing packaging configurations of the present invention facilitate ease of computing through lightweight, convertible arrangements with freestanding computing modules that can be combined into many configurations including both wearable and laptop configurations, both with wire based and/or wireless communications and portable display and input/output devices. This system of arrangeable computing elements and related devices allows the computer to be adapted to shape and form to suit the needs of a particular use or location. Accordingly, the user can, at a moments notice, convert a computer in the field in a wearable configuration to a laptop configuration for use in the office, desktop, or other non-wearable use.

While the invention has been described with respect to certain embodiments, the specification and drawings are meant to be illustrative; the invention is by no means limited to the specific configurations and other features specifically illustrated and literally described. Various modifications will be apparent to those of ordinary skill in the art.

What is claimed is:

1. An electronic computing device comprising:
   a plurality of operatively communicatively coupled microcomputing components, including a processor for performing computer processing functions, connected to form a wearable computer; and
   at least one laptop computing component added to the plurality of microcomputing components to form a laptop computer, the at least one laptop computing component being selected from the group consisting of a keyboard and a display, the microcomputing components being free of the at least one laptop computing component when the microcomputing components are connected to form a wearable computer, the microcomputing components being rearranged relative to each other when connected to form a laptop computer instead of a wearable computer.

2. The device of claim 1 wherein the laptop computer includes a base support having means for removably mounting the microcomputing elements thereon.

3. The device of claim 2 wherein the at least one laptop computing component comprises a keyboard, further wherein the base support further includes a first surface having a recess with means for removably mounting the computing components therein and a second surface with means for removably mounting the keyboard thereon.

4. The device of claim 2 wherein the at least one laptop computing component comprises a display screen operatively communicatively coupled to the plurality of microcomputing components and hingedly connected to the base support.

5. The device of claim 4 wherein the display screen further comprises at least one of a mini-keypad input device and a touch pad input device.

6. The device of claim 1, further comprising a support, physically distinct from the microcomputing components, for housing and supporting the wearable computer on the body of a wearer.

7. The device of claim 1, wherein the at least one laptop computing component comprises a keyboard and display connected together.

8. A portable electronic computer comprising:
   a display screen;
   a plurality of operably communicatively coupled microcomputer elements, each disposed within its own enclosure, and operatively communicatively coupled to the display screen, including a processor for performing computer processing functions; and
   a housing wherein the microcomputer elements are disposed within the housing; further wherein the housing further defines a pouch with the microcomputing elements removably disposed within the pouch and the pouch including an outer surface having at least one keypad-type input output device.

9. The computer of claim 8 and further comprising:
a base support operatively communicatively coupled to the display screen and configured and arranged for removably mounting the microcomputer elements thereon.

10. The computer of claim 9 wherein the base support further defines a first surface having a recess with means for removably mounting the microcomputer elements therein.

11. The computer of claim 9 wherein the base support further defines a second surface with means for removably mounting a keyboard thereon.

12. The computer of claim 9 wherein the base support is hingedly removably connected to the display screen.

13. The computer of claim 8 wherein the housing is removably mounted on the base support.

14. The computer of claim 8 and further comprising:
a base support operatively communicatively coupled to the display screen and constructed for removably mounting the housing thereon.

15. The computer of claim 14 wherein the housing is mounted on a top side of the support.

16. The computer of claim 14 wherein the housing is mounted on a bottom side of the support.

17. The computer of claim 8 wherein the housing is a flexible member.

18. The computer of claim 8 wherein the housing includes an outer surface having a cavity formed therein for receiving a display screen.

19. The computer of claim 18 wherein the computer further includes a second display screen operatively communicatively coupled to the microcomputer elements in the housing.

20. The computer of claim 8 wherein each of the microcomputing elements further include a portion of a wireless communication network to define operative communication coupling between the microcomputer elements.

21. The computer of claim 8 wherein the microcomputing elements and display screen define a local area network.

22. A method of using a computer comprising:
wearing about a user an elongate flexible support member having a plurality of batteries and multiple computing modules arranged thereon so that the batteries are disposed on the sides of the user while the computing modules are disposed on a rear portion of the user;
removing the support member from the user; and
adding at least one laptop component to the batteries and computing modules to form a laptop computer.

23. The method of claim 22 wherein the wearing step further comprises:
wearing an input/output device arranged adjacent an end of the support member at a front of the user.

24. The method of claim 22 and further comprising:
holding a display device with at least one auxiliary device storage holder on the support member, the holder operatively communicating with the display device and the computing modules.

25. A method of converting a wearable computer into a laptop computer, the method comprising:
providing a wearable computer, the wearable computer comprising a plurality of connected microcomputing components, including a processor for performing computer processing functions;
providing a support, physically distinct from the microcomputing components, for supporting the wearable computer on the body of a wearer;
rearranging the microcomputing components of the wearable computer; and
connecting at least one laptop computing component to the rearranged microcomputing components, the at least one laptop computing component being selected from the group consisting of a keyboard and a display, to form a laptop computer;
wherein the microcomputing components are free of the at least one laptop computing component when the microcomputing components are connected as a wearable computer.

26. The method of claim 25, wherein the at least one laptop computing component comprises a keyboard and display connected together.

27. The method of claim 25, wherein the rearranged microcomputer components are placed into an enclosure; further wherein the at least one laptop computing component is supported on the enclosure.

28. The method of claim 25, further comprising placing the microcomputing components onto a base support before connecting the at least one laptop computing component.

29. The method of claim 28, further comprising:
inserting the microcomputing components into a flexible housing prior to placing the components onto the base support;
removably mounting the housing with the microcomputer components therein onto the base support.

30. The method of claim 28, further comprising;
snap-fitting the microcomputer components into a recess of a first surface of the base support.

31. A computer system, comprising:
a plurality of batteries;
at least one computing component including at least one processor, the at least one computing component operably coupled with the plurality of batteries;
support structure constructed to support the plurality of batteries and the at least one computing module on the body of a human wearer, the support structure supporting the plurality of batteries on opposite sides of the at least one computing module while worn on the body of the wearer to form a wearable computer; and
at least one laptop component constructed for operable connection to the plurality of batteries and to the at least one computing component to form a laptop computer, wherein the plurality of batteries are in a different arrangement relative to the at least one computing module when the plurality of batteries are operably connected to the at least one laptop component.

32. The system of claim 31, wherein the plurality of batteries are disposed on only one side of the at least one computing module when the laptop computer is formed.

33. The system of claim 31, wherein the plurality of batteries includes a first plurality of batteries arranged in series and a second plurality of batteries arranged in series on opposite sides of the at least one computing module when the wearable computer is formed.

34. The system of claim 33, wherein the first and second pluralities of batteries are on only one side of the at least one computing module when the laptop computer is formed.

35. The system of claim 31, wherein the at least one laptop component comprises a keyboard component.

36. The system of claim 31, wherein the at least one laptop component comprises a display component.

37. The system of claim 31, wherein the plurality of batteries are disposed underneath the at least one laptop component when the laptop computer is formed.

38. A method of arranging a plurality of computing elements, the method comprising:

provising a conventional cloth necktie, the necktie having a narrow portion for disposition near the neck of a wearer of the necktie and a wider portion for disposition near the waist of a wearer of the necktie; and supporting the plurality of computing elements with the necktie, the plurality of computing elements being disposed between the narrow portion of the necktie and the wider portion of the necktie, to form a wearable computer.

39. The method of claim 38, wherein the computing elements are flexibly connected together.

40. The method of claim 38, further comprising:

providing a belt for wearing about the waist of the wearer; and supporting at least one battery with the belt, the at least one battery providing power to the wearable computer.

41. The method of claim 38, further comprising:

supporting a display screen at the wider portion of the necktie.

42. The method of claim 38, further comprising:

supporting an input/output device with the necktie.

43. A method of arranging a plurality of computing elements, the method comprising:

providing a pair of pants;

providing a pair of suspenders, connected to the pair of pants, to support the pair of pants on the body of a wearer;

supporting the plurality of computing elements on the suspenders to form a wearable computer.

44. The method of claim 43, wherein the computing elements are flexibly connected together.

* * * * *